(No Model.)   2 Sheets—Sheet 2.
R. E. HYDE.
PLANTER.
No. 375,421. Patented Dec. 27, 1887.
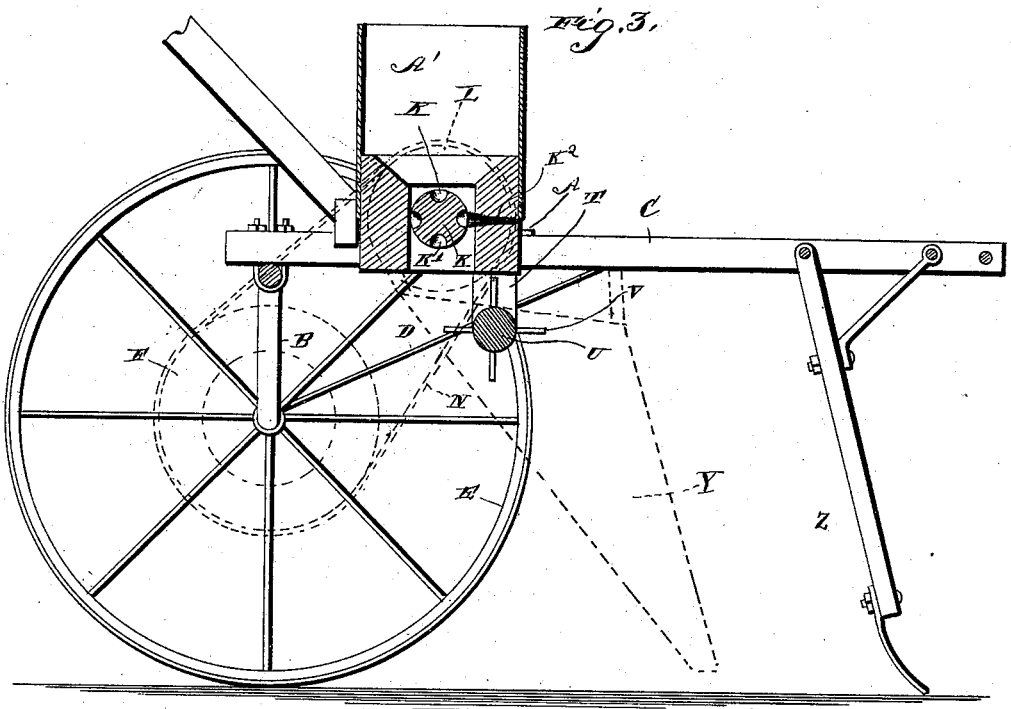
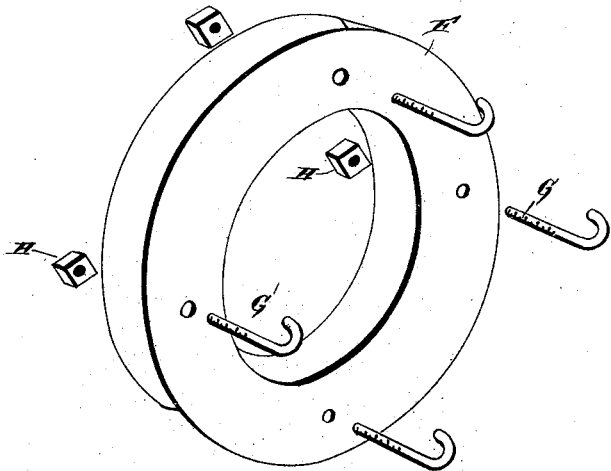
WITNESSES
C. D. Taylor
J. W. Garner
INVENTOR
R. E. Hyde
by C. A. Socorro
Attorneys

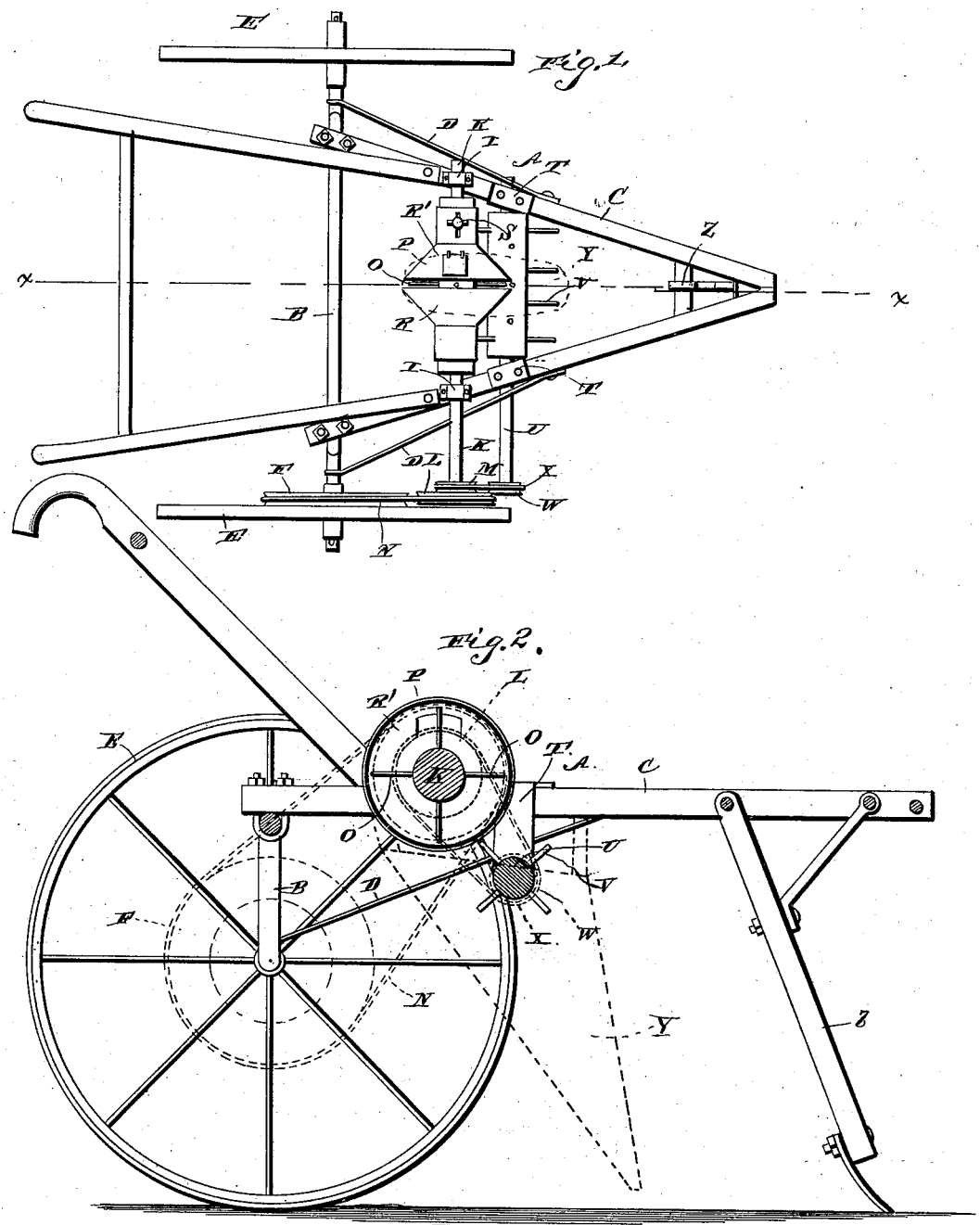

UNITED STATES PATENT OFFICE.

RICHARD EDMUND HYDE, OF MIDWAY, TEXAS.

PLANTER.

SPECIFICATION forming part of Letters Patent No. 375,421, dated December 27, 1887.

Application filed May 20, 1887. Serial No. 238,892. (No model.)

*To all whom it may concern:*

Be it known that I, RICHARD EDMUND HYDE, a citizen of the United States, residing at Midway, in the county of Madison and State of Texas, have invented a new and useful Improvement in Planters, of which the following is a specification.

My invention relates to an improvement in planters; and it consists in the peculiar construction and combination of devices, that will be more fully set forth hereinafter, and particularly pointed out in the claims.

The object of my invention is to provide a planter which is adapted to be connected to the frame of a sulky-cultivator and operated by one of the wheels thereof.

In the accompanying drawings, Figure 1 is a top plan view of a cotton-planter embodying my improvements, showing the same connected to the frame of a sulky-cultivator. Fig. 2 is a vertical longitudinal sectional view of the same, taken on the line $x\ x$ of Fig. 1. Fig. 3 is a vertical longitudinal sectional view of a corn-planter embodying my improvements, showing the same connected to the frame of the sulky-cultivator. Fig. 4 is a detached perspective view of the driving-pulley, showing the hook-bolts for connecting the same to one of the wheels of the cultivator.

A represents the frame of a sulky-cultivator such as are now in common use, of which B is the arched axle, and C are the forward converging beams, which have their rear ends secured to the raised portion of the axle and their front ends connected to the draft-pole or tongue.

B represents inclined brace-rods, which connect the beams C to the inner ends of the spindles of the axle.

E represents the usual supporting-wheels, which are journaled on the axle-spindles.

F represents the driving-pulley, which is of suitable size, and is provided with a central opening large enough to clear the inner end of the hub of one of the wheels E, so that the outer side of the said pulley may be caused to bear against the inner sides of the spokes of the said wheel. Through the said pulley is made a number of transverse openings corresponding to the number of spokes in the wheel, and through the said openings are inserted the shanks of bolts G. The outer ends of the said bolts are curved, to form hooks, which are adapted to engage the outer sides of the spokes of the wheel B, and on the inner ends of the said bolts, which are screw-threaded, are screwed clamping-nuts H, by means of which the pulley F may be firmly secured to the spokes of the wheel, as will be readily understood. The said clamping-hook, bolts, and nuts also enable the pulley F to be readily detached from the wheel E.

I represents a pair of bearing-blocks, which are bolted on the upper sides of the beams C at suitable distances from the rear ends of the said beams.

K represents a transverse shaft, which has reduced extremities journaled in the bearing-blocks I. One of the reduced ends of the shaft is elongated and projects outward beyond the frame to within a suitable distance of the driving-wheel E, and to the outer end of the said extended portion of the shaft is rigidly attached a pulley, L, which is connected to the driving-pulley F by means of an endless belt, N.

M represents a pulley, which is secured on the inner side of the shaft K and bears against the pulley L, the said pulley M being smaller than pulley L.

From the central portion of the shaft K, midway between the block I, project a series of radial stirring-arms, O.

P represents a hopper, which is composed of a pair of truncated conical sections, R and R', having their bases presented toward each other and their apices secured to the ends of the shaft K. The section R' is adjustable longitudinally on the said shaft, so that the discharge-opening formed between the opposing inner sides or bases of the sections may be enlarged or reduced in size, according to the quantity of seeds desired to be fed from the hopper, and the said movable section R' of the hopper is provided with a set-screw, S, whereby it may be clamped on the shaft K at any desired adjustment.

T represents a pair of standards or plates, which are detachably secured to the beam C at a slight distance in front of the shaft K and depend from the said beam. In the said standards is journaled a transverse shaft, U, which is provided with series of radial distributing-arms V. One end of the shaft U is reduced in diameter and elongated, and to the outer end thereof is attached a pulley, W, which is connected to the pulley M by means of an endless belt, X, and thereby, when the shaft K is rotated as the machine advances, rotary motion is imparted to the shaft U, and the seeds as they drop from the hopper are scattered by the rotating teeth V of the said shaft U.

Y represents a seed-spout which is secured to the frame of the cultivator and is arranged under the shaft U, and is adapted to receive the seeds which are scattered by the said shaft and convey the same to the furrow made by the usual furrow-opener, Z, attached in any suitable manner to the front portion of the frame. The operator, who walks in rear of the machine, grasps the handles of the cultivator-beams, of usual construction, with which the cultivator-frame is provided, and so directs the cultivating-shovels that they are caused to cover the seeds in the furrow.

In Fig. 3 I illustrate a modified form of my invention, in which the hopper P is removed, and a hopper, A', is attached to the shaft K in lieu thereof. The said shaft K is provided with depressions or recesses K' at suitable distances apart, which form seed-cups arranged in the bottom of the hopper, and in the bottom of the said hopper, in the front side thereof, is a brush, K², which bears against the front side of the shaft and serves to cut off the seeds from the cups as the latter move forward by the rotation of the shafts, and as each cup gets to the under side of the shaft the seeds therein drop upon the shaft U and are scattered by the arms V thereof before entering the upper end of the seed-spout.

The form of my invention illustrated in Figs. 1 and 2 is adapted for planting cotton, and the form thereof illustrated in Fig. 3 is adapted for planting corn and peas, as will be readily understood.

A planter thus constructed is extremely cheap and simple, and is adapted to be attached to and used in connection with an ordinary sulky-cultivator, thereby enabling the farmer to provide himself with an improved planting-machine at a very slight expense.

I have employed a planter such as described herein in planting a large crop, and find that it works very successfully.

Having thus described my invention, I claim—

In a planter, the combination of the frame having the supporting-wheels, one of which has the pulley F, the shaft K, having the radial stirring-arms O, and the hopper P, secured to the shaft and rotating therewith, the pulleys L and M, attached to shaft K, the shaft U, arranged below the hopper, and having the radial arms V and the pulley W, the endless belt X, connecting pulleys W and M, and the endless belt N, connecting pulleys F and L, substantially as described.

In testimony that I claim the foregoing as my own I have hereto affixed my signature in presence of two witnesses.

RICHARD EDMUND HYDE.

Witnesses:
J. E. ALLEN,
W. F. WAKEFIELD.